United States Patent
Hursey et al.

(10) Patent No.: US 7,210,168 B2
(45) Date of Patent: Apr. 24, 2007

(54) UPDATING MALWARE DEFINITION DATA FOR MOBILE DATA PROCESSING DEVICES

(75) Inventors: Neil John Hursey, Hertfordshire (GB); William Alexander McEwan, Bedfordshire (GB)

(73) Assignee: McAfee, Inc., Santa Clara, CA (US)

( * ) Notice: Subject to any disclaimer, the term of this patent is extended or adjusted under 35 U.S.C. 154(b) by 868 days.

(21) Appl. No.: 09/976,009

(22) Filed: Oct. 15, 2001

(65) Prior Publication Data

US 2003/0074581 A1 Apr. 17, 2003

(51) Int. Cl.
G06F 21/00 (2006.01)
G06F 21/24 (2006.01)
(52) U.S. Cl. ............................................ 726/24
(58) Field of Classification Search ............... 713/201, 713/200, 154; 395/183; 709/224
See application file for complete search history.

(56) References Cited

U.S. PATENT DOCUMENTS

| | | | |
|---|---|---|---|
| 5,948,104 A * | 9/1999 | Gluck et al. | 713/200 |
| 6,035,423 A | 3/2000 | Hodges et al. | |
| 6,205,551 B1 * | 3/2001 | Grosse | 713/201 |
| 6,279,113 B1 * | 8/2001 | Vaidya | 713/201 |
| 6,338,141 B1 * | 1/2002 | Wells | 713/200 |
| 2002/0042886 A1 * | 4/2002 | Lahti et al. | 713/201 |

FOREIGN PATENT DOCUMENTS

| | | |
|---|---|---|
| EP | 1 184 772 | 3/2002 |
| WO | WO 98/38820 | 9/1998 |
| WO | WO 9838820 A2 * | 9/1998 |
| WO | WO 02/19067 | 3/2002 |

* cited by examiner

Primary Examiner—Gilberto Barron
Assistant Examiner—Carl Colin
(74) Attorney, Agent, or Firm—Zilka-Kotab, PC; Christopher J. Hamaty (57) ABSTRACT

The malware definition data of mobile data processing devices is updated via a data channel associated with a wireless telephony link to that mobile data processing device. The data channel may be the same channel wed for SMS messaging and the transfer of control information. The mobile data processing device is typically a mobile telephone. The update data may be digitally signed to increase security.

48 Claims, 3 Drawing Sheets

UPDATING MALWARE DEFINITION DATA FOR MOBILE DATA PROCESSING DEVICES

BACKGROUND OF THE INVENTION

1. Field of the Invention

This invention relates to the field of data processing systems. More particularly, this invention relates to the updating of malware definition data used by a malware scanner upon mobile data processing devices.

2. Description of the Prior Art

Mobile data processing devices are becoming more common and increasingly powerful. As, the processing capabilities of mobile data processing devices, such as mobile telephones and personal digital assistants (PDAs) are increasing, these devices are at the same time also becoming a target for computer viruses and other types of malware. It is known to provide malware scanners for personal digital assistants.

A problem with malware scanners is that the malware definition data must be kept up to date in order that they are able to provide good protection. Rapidly spreading computer viruses are typically ones that are new as the defences against these computer viruses will not yet be in place and accordingly they have a period of time during which they can rapidly spread. What normally happens is that a new computer virus is released and spreads to some extent at which point it becomes recognised by the providers of malware scanners. The provider of the malware scanner can then analyse the new computer virus and generate malware definition data that can be used by their products to identify and take remedial action against the new virus threat. This update data needs distributing to the data processing systems that are to be protected. Only once these data processing systems have the new malware definition data in place will they be able to resist infection by the new computer virus.

Conventional fixed data processing systems, such as office personal computers and the like typically have permanent physical network connections through which rapid updating of malware definition data may be made. Mechanisms for distributing such malware definition updating data are known within the context of fixed data processing systems, such as office personal computers.

SUMMARY OF THE INVENTION

Viewed from one aspect the present invention provides a computer program product for controlling a mobile data processing device to update malware definition data for a malware scanner of said mobile data processing device, said computer program product comprising:

(i) link establishing code operable to establish a wireless telephony link between said mobile data processing device and a public wireless telephony network;

(ii) update receiving code operable to receive malware definition updating data at said mobile data processing device via a data channel of said wireless telephony link; and (iii) malware definition updating code operable to update malware definition data stored upon said mobile data processing device using said malware definition updating data.

The invention recognises that many mobile data processing devices have public wireless telephony network connections to them. As an example, a mobile data processing device having the form of a mobile telephone will by virtue of its primary use have a connection to a public wireless telephony network. Whilst such public wireless telephony networks have as their primary role the provision of voice communication, they also typically provide a data channel via which the mobile data processing device is able to exchange control data with the public wireless telephony network infrastructure. Although the data channel has a relatively limited capacity it has been developed to provide text messaging services such as SMS. The invention recognises that whilst the capacity of the data channel may be limited, e.g. an SMS text message may be limited to 60 characters, this low level of capacity is in fact sufficient to distribute highly critical malware definition updating data. As an example, a computer virus signature might typically only be 20 bytes in length and accordingly a data channel within the public wireless telephony network is more than sufficient in capacity to effectively transfer this data. It will be appreciated that the data channel could take a wide variety of forms that can link a base/server computer to a mobile device, e.g. SMS, IP packet, etc.

In order to improve the security of the system, preferred embodiments of the invention apply a digital signature to the malware definition updating data. Such a digital signature can be checked at the receiving device in order to ensure that the update is from the authorised source before it is used.

Whilst it will be appreciated that the technique of the invention could be provided using a wide variety of telephony systems, the invention is particularly well suited to CDMA networks and GSM networks, and the data channel being used in preferred embodiments will be the channel used for passing text messages, such as SMS messages.

A particular advantage of the present technique is that the updating can be initiated by the source of the malware definition updating data. Thus, the updating can be a push-technology system rather than a pull-technology system. In this way, as soon as a virus threat is identified and the appropriate malware definition updating data produced, this can be pushed out to the mobile data processing devices without having to wait for the users of those devices to become aware of the threat and pull the data down from the central source.

This push behaviour is further enhanced in that the data channel will preferably be available whenever the mobile data processing device is switched on such that even if the device is not switched on when the update is first issued, as soon as it is switched on and so becomes vulnerable to the threat for the first time, the updated malware definition data will rapidly reach it and provide the appropriate protection.

It will be appreciated that one aspect of the invention concerns the mobile device adapted to receive the malware definition updating data. Another aspect of the invention relates to the system for pushing out that data. Accordingly, viewed from another aspect the invention provides a computer program product for controlling a computer to initiate updating of malware definition data for a malware scanner of a mobile data processing device, said computer program product comprising:

(i) link establishing code operable to establish a wireless telephony link to said mobile data processing device via a public wireless telephony network; and (ii) update sending code operable to send malware definition updating data to said mobile data processing device via a data channel of said wireless telephony link.

As well as being embodied in the form of a computer program product for controlling a data processing device in accordance with the above described techniques, the invention may also be viewed as a method for updating malware defining data and an apparatus for updating malware defining data.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
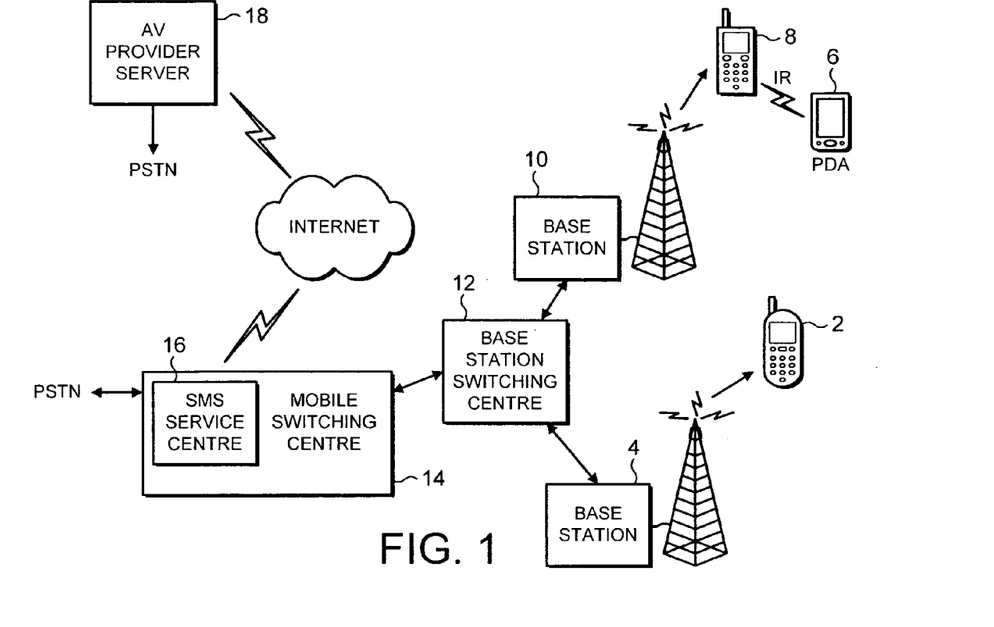
FIG. 1 schematically illustrates an overall system by which malware definition updating data may be provided to mobile data processing devices.

FIG. 1 shows a first mobile data processing device 2 in the form of a mobile telephone connected via a GSM or CDMA public wireless telephony network to a base station 4. Also illustrated is a second mobile data processing device 6 in the form of a personal digital assistant connected via an infrared link to a mobile telephone 8 which is in turn connected via a public wireless telephony link to a base station 10. The base stations 4, 10 are connected to a base station switching centre 12 which is in turn connected to a central mobile switching centre 14 for the public wireless telephony network concerned. Provided at the mobile switching centre 14 is an SMS service centre 16 which is responsible for managing the transfer of SMS text messages to and from connected mobile data processing devices 2, 6. These SMS messages pass over a data channel within the public wireless telephony network to the mobile data processing devices 2, 6. This same data channel can be used for transmitting non-text data, such as control data or in the case of the present technique malware definition updating data.

A provider of malware scanning systems has a server computer 18 connected to the internet and to the public switched telephone network. When a new malware threat is identified, the software provider generates malware definition updating data that needs to be sent to the mobile data processing devices 2, 6. The server 18 issues appropriate messages addressed by the telephone number of the mobile data processing devices to the mobile data processing devices via the internet or the public switch telephone network. These malware definition updating data messages may be processed in a manner similar to SMS text messages by the SMS service centre 16. In particular, these messages may be queued within the SMS service centre of the originator for delivery to the mobile data processing device 2, 6 either straight away or when that mobile data processing device 2, 6 connects to the public wireless telephony network for the first time after having been switched off.

Figure 2:
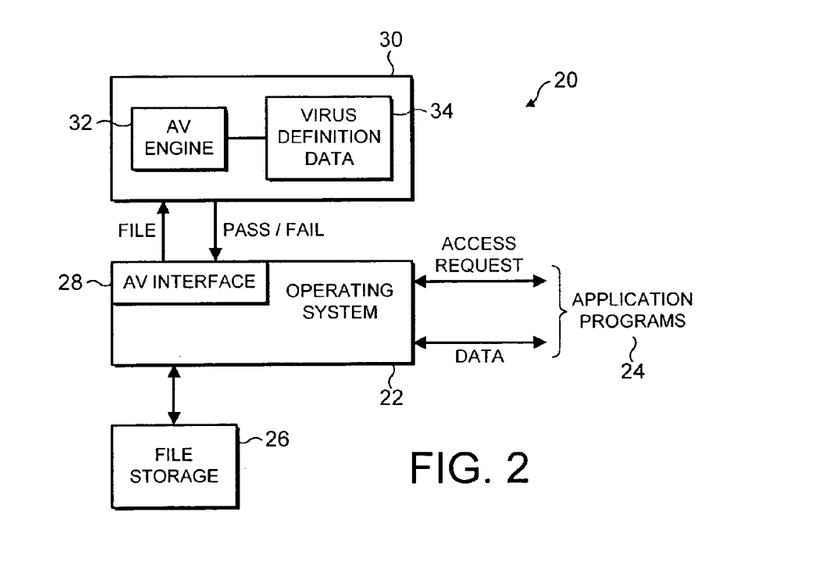
FIG. 2 schematically illustrates a malware scanner for a mobile data processing device.

FIG. 2 schematically illustrates a system 20 including a malware scanner 30 that may operate within a mobile data processing device 2,6. Mobile data processing devices 2, 6 are becoming increasingly complex and are adopting an arrangement similar to conventional fixed data processing devices in that they use an operating system 22 which coordinates interaction with the physical systems on behalf of one or mare application programs 24 that may be executing. The file storage 26 within such a device will typically be in the form of nonvolatile compact storage, such as RAM memory, flash memory or the like.

When an application program 24 makes a request to the operating system 22 to access a computer file stored in the file storage 26, this request is intercepted by an anti-virus interface 28 within the operating system 22 and details of the file access request and the file itself are passed to a malware scanner 30. The malware scanner 30 effectively takes the form of another application program running on the operating system 22. The malware scanner 30 includes an anti-virus scanning engine 32 and malware definition data (e.g. virus definition data 34). The malware scanner 30 operates upon the file received to search that file to see if it contains code matching the virus definition data that would be indicative of the computer file being infected with a computer virus. A pass/fail result is passed back via the anti-virus interface 28 to the operating system 22. The operating system 22 will then either allow the file access to proceed normally or trigger and-virus action if a virus has been detected, e.g. deletion, disinfection, quarantine.

It will be appreciated that the virus definition data 34 needs to be regularly updated to include fingerprint data relating to the most recently released computer viruses, Trojans, worms and other malware. These updates to the virus definition data 34 may be distributed in the form of small update files that are digitally signed to ensure their authenticity and which contain the fingerprint data of the newly discovered malware threats. These update files can be very short as a reliable virus fingerprint may typically only be 20 bytes in length.

Figure 3:
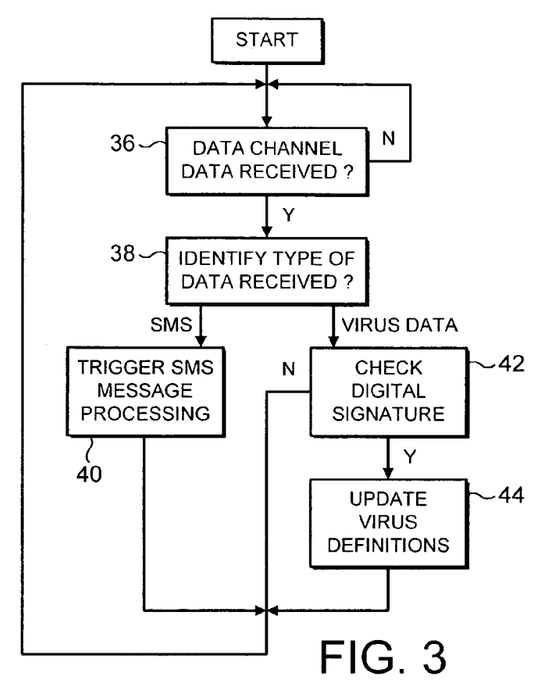
FIG. 3 is a flow diagram schematically illustrating processing that may be performed upon a mobile data processing device.

FIG. 3 schematically illustrates the processing that may be performed by a mobile data processing device 2, 6 to update its virus definition data 34. At step 36 the device 2, 6 waits until data is received upon its data channel that forms part of the wireless telephony link via the public wireless telephony network. It will be appreciated that the mobile data processing device 2,6 will previously have established such a wireless telephony link in accordance with the standard operation of mobile phones and the like. When a mobile phone establishes such a link, it registers with a base station such that the base station and public wireless telephony network is notified of the telephone number of the mobile telephone concerned such that telephone calls and data, such as SMS messages and malware definition update data, can be routed to the correct mobile telephone.

When some data is received in the data channel, processing proceeds to step 38 at which the type of data received is identified. In this example, only two types of data are illustrated, namely SMS text message data and malware definition updating data. It will be appreciated that further types of data may also be transmitted via the data channel, such as control data for the device concerned.

If the data type is an SMS text message, then processing proceeds to step 40 at which the SMS message processing is triggered, such as displaying the message on the display of the device, issuing an audible notification to the user of the arrival of the message and the like.

If the data type identified at step 38 is malware definition updating data, then processing proceeds to step 42 at which a digital signature upon the received data is checked. Such digital signature techniques are known in the data processing field, for example a public key/private key arrangement may be utilised.

If the digital signature is not verified, then processing returns to step 36 and the received malware definition updating data is ignored. If the digital signature is verified, then processing proceeds to step 44 where the malware definition updating data is applied, e.g. by appending to the virus definition data 34 of FIG. 2, in order to give protection against the newly discovered malware threats. Processing then returns to step 36.

Figure 4:
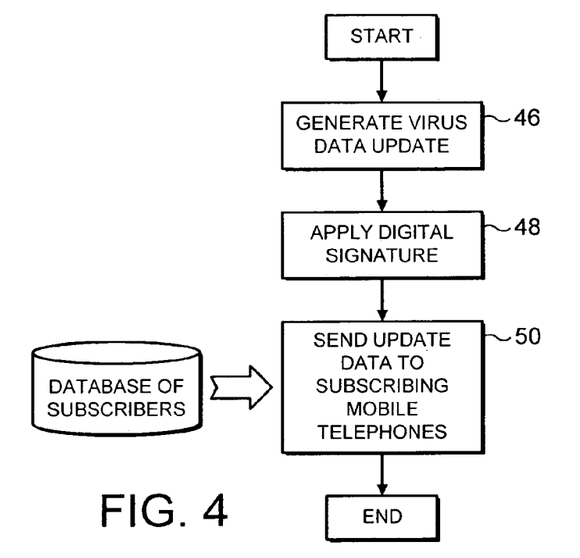
FIG. 4 is a flow diagram schematically illustrating processing that may be performed at a source of malware definition updating data.

FIG. 4 schematically illustrates processing that may be performed by a malware scanner provider, such as the operator of the server 18 of FIG. 1. At step 46 a malware definition updating data file is generated. This file may be generated by automatic, semi-automatic or manual techniques involving the analysis of a newly discovered piece of malware and the generation of an appropriate detection fingerprint and possible associated removal, disinfection, etc mechanisms.

At step 48 a digital signature is applied to the generated malware definition updating data.

At step 50 access is made to a database of subscribers to the update service and the digitally signed malware definition updating data is sent out to the subscribers via the data channel associated with the public wireless telephony network. The database of subscribers may include details of the telephone numbers of the mobile data processing devices to which the update is to be sent. Further details may also be included within the database, such as the nature of the target data processing device such that the update will only be sent if it is appropriate to that data processing device.

Figure 5:
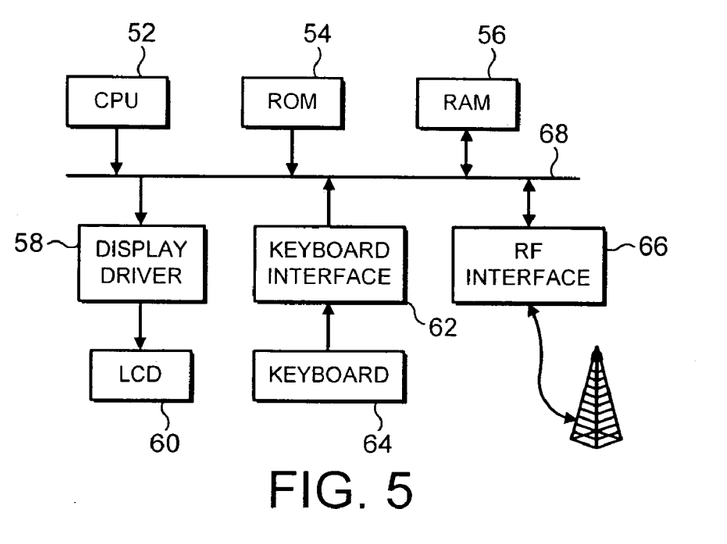
FIG. 5 is a diagram schematically illustrating the architecture of a mobile data processing device that may be used to implement the above described techniques.

FIG. 5 schematically illustrates the architecture of a mobile data processing device. In this case the device has the form of a mobile telephone. The device may be considered as comprising a central processing unit 52, a read only memory (ROM) 54, a random access memory (RAM) 56, a display driver 58 and associated LCD display 60, a keyboard interface 62 and associated keyboard 64 and a radio frequency signal interface 66 all connected via a common bus 68.

In operation a computer program stored within the ROM 54 or the RAM 56 controls execution of data processing instructions by the central processing unit 52 to perform the above described techniques. In particular, the computer program will control establishing of a wireless telephony link, reception of the malware definition updating data, checking of the digital signature on that data and appending of that data to the virus definition data as appropriate. The software running in the system will also perform the malware scanner function. The general purpose processing logic of FIG. 5 can also be seen to provide an apparatus for performing the above described techniques.

Figure 6:
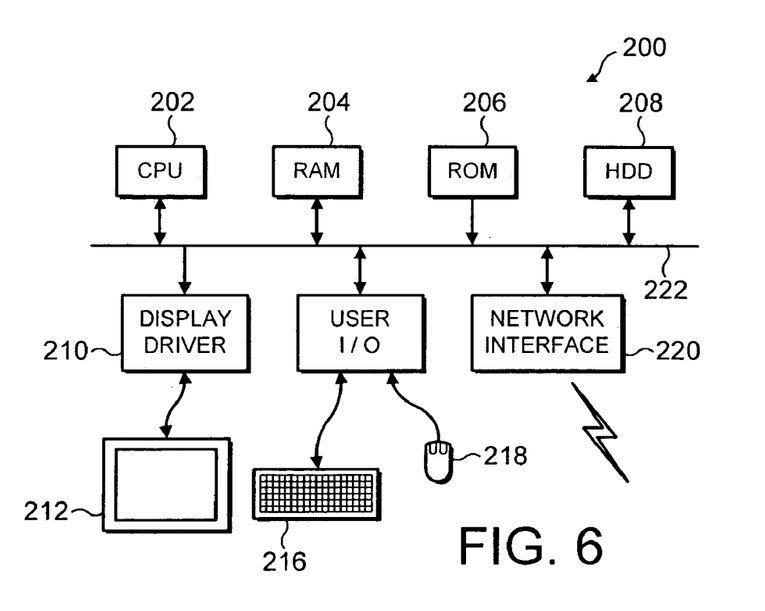
FIG. 6 is a diagram schematically illustrating the architecture of a data processing device that may be used as a source of malware definition updating data.

FIG. 6 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a computer readable medium for controlling a mobile data processing device to update malware definition data for a malware scanner of said mobile data processing decide, said computer program product comprising:
    (i) link establish code operable to establish a wireless telephony link between said mobile data processing device and a public wireless telephony network;
    (ii) update receiving code operable to receive malware definition updating data at said mobile data processing device via a data channel of said wireless telephony link; and
    (iii) malware definition updating code operable to update malware definition data stored upon said mobile data processing device using said malware definition updating data;
    wherein said mobile data processing device registers with a base station of said wireless telephony network when said link is established such that said base station and said wireless telephony network are notified of a telephone number of said mobile data processing device for use in sending said malware definition updating data to said mobile data processing device;
    wherein when received data is received at said mobile data processing device, a type of said received data is identified to determine if said received data is said malware definition updating data, such that if said received data is said malware definition updating data, a digital signature associated with said malware definition updating data is verified;
    wherein if said digital signature is not verified, said malware definition updating data is ignored;
    wherein if said digital signature is verified, said malware definition updating data is utilized to update said malware definition data stored upon said mobile data processing device by appending said malware definition updating data to said malware definition data;
    wherein said malware definition updating data is provided in a malware definition updating file, where said file is generated by one of automatically, semi-automatically, and manually upon an analysis of newly discovered malware and where said file includes a detection fingerprint, and at least one of a removal action and a disinfection action to be taken in response to a detection of said newly discovered malware;

wherein said mobile data processing device is identified by a database of subscribers to an update service associated with said malware scanner, where said database includes said telephone number of said mobile data processing device to which said malware definition updating data is to be sent and a type of said mobile data processing device such that only malware definition updating data that is appropriate to said type of said mobile data processing device is sent to said mobile data processing device.

2. A computer program product as claimed in claim 1, wherein said mobile data processing device is a mobile telephone.

3. A computer program product as claimed in claim 1, wherein said mobile data processing device is a personal digital assistant having a connection to said wireless public telephony network.

4. A computer program product as claimed in claim 1, wherein said public wireless telephone network is one of a CDMA network and a GSM network.

5. A computer program product as claimed in claim 1, wherein said data channel is also used for passing text messages.

6. A computer program product as claimed in claim 5, wherein said text messages are SMS messages.

7. A computer program product as claimed in claim 1, wherein said step of receiving malware definition updating data is initiated from a source of said malware definition updating data.

8. A computer program product as claimed in claim 1, wherein said data channel is open whenever said mobile data processing device is switched on and connected to said public wireless telephony network.

9. A computer program product embodied on a computer readable medium for controlling a computer to initiate updating of malware definition data for a malware scanner of a mobile data processing device, said computer program product comprising:
  (i) link establishing code operable to establish a wireless telephony link to said mobile data processing device via a public wireless telephony network; and
  (ii) update sending code operable to send malware definition updating data to said mobile data processing device via a data channel of said wireless telephony link.
  wherein said mobile data processing device registers with a base station of said wireless telephony network when said link is established such that said base station and said wireless telephony network are notified of a telephone number of said mobile data processing device for use in sending said malware definition updating data to said mobile data processing device;
  wherein when received data is received at said mobile data processing device, a type of said received data is identified to determine if said received data is said malware definition updating data, such that if said received data is said malware definition undating data, a digital signature associated with said malware definition undating data is verified;
  wherein if said digital signature is not verified, said malware definition updating data is ignored,
  wherein if said digital signature is verified, said malware definition updating data is utilized to update malware definition data stored upon said mobile data processing device by appending said malware definition updating data to said malware definition data;
  wherein said malware definition updating data is provided in a malware definition updating file, where said file is generated by one of automatically, semi-automatically, and manually upon an analysis of newly discovered malware and where said file includes a detection fingerprint, and at least one of a removal action and a disinfection action to be taken in response to a detection of said newly discovered malware;
  wherein said mobile data processing device is identified by a database of subscribers to an update service associated with said malware scanner, where said database includes said telephone number of said mobile data processing device to which said malware definition undating data is to be sent and a type of said mobile data processing device such that only malware definition updating data that is appropriate to said type of said mobile data processing device is sent to said mobile data processing device.

10. A computer program product as claimed in claim 9, wherein said mobile data processing device is a mobile telephone.

11. A computer program product as claimed in claim 9, wherein said mobile data processing device is a personal digital assistant having a connection to said wireless public telephony network.

12. A computer program product as claimed in claim 9, wherein said public wireless telephone network is one of a CDMA network and a GSM network.

13. A computer program product as claimed in claim 9, wherein said data channel is also used for passing text messages.

14. A computer program product as claimed in claim 13, wherein said text messages are SMS messages.

15. A computer program product as claimed in claim 9, wherein transfer of malware definition updating data is initiated from a source of said malware definition updating data.

16. A computer program product as claimed in claim 9, wherein said data channel is open whenever said mobile data processing device is switched on and connected to said public wireless telephony network.

17. A method of updating malware definition data for a malware scanner of a mobile data processing device, said method comprising the steps of:
  (i) establishing a wireless telephony link between said mobile data processing device and a public wireless telephony network;
  (ii) receiving malware definition updating data at said mobile data processing device via a data channel of said wireless telephony link; and
  (iii) updating malware definition data stored upon said mobile data processing device using said malware definition updating data;
  wherein said mobile data processing device registers with a base station of said wireless telephony network when said link is established such that said base station and said wireless telephony network are notified of a telephone number of said mobile data processing device for use in sending said malware definition updating data to said mobile data processing device;
  wherein when received data is received at said mobile data processing device, a type of said received data is identified to determine if said received data is said malware definition updating data, such that if said received data is said malware definition updating data, a digital signature associated with said malware definition updating data is verified;

wherein if said digital signature is not verified, said malware definition updating data is ignored;

wherein if said digital signature is verified, said malware definition undating data is utilized to update said malware definition data stored upon said mobile data processing device by appending said malware definition updating data to said malware definition data;

wherein said malware definition updating data is provided in a malware definition updating file, where said file is generated by one of automatically, semi-automatically, and manually upon an analysis of newly discovered malware and where said file includes a detection fingerprint, and at least one of a removal action and a disinfection action to be taken in response to a detection of said newly discovered malware;

wherein said mobile data processing device is identified by a database of subscribers to an update service associated with said malware scanner, where said database includes said telephone number of said mobile data processing device to which said malware definition updating data is to be sent and a type of said mobile data processing device such that only malware definition undating data that is appropriate to said type of said mobile data processing device is sent to said mobile data processing device.

18. A method as claimed in claim 17, wherein said mobile data processing device is a mobile telephone.

19. A method as claimed in claim 17, wherein said mobile data processing device is a personal digital assistant having a connection to said wireless public telephony network.

20. A method as claimed in claim 17, wherein said public wireless telephone network is one of a CDMA network and a GSM network.

21. A method as claimed in claim 17, wherein said data channel is also used for passing text messages.

22. A method as claimed in claim 21, wherein said text messages are SMS messages.

23. A method as claimed in claim 17, wherein transfer of said malware definition updating data is initiated from a source of said malware definition updating data.

24. A method as claimed in claim 17, wherein said data channel is open whenever said mobile data processing device is switched on and connected to said public wireless telephony network.

25. A method of updating malware definition data for a malware scanner of a mobile data processing device, said method comprising the steps of:
(i) establishing a wireless telephony link to said mobile data processing device via a public wireless telephony network; and
(ii) sending malware definition updating data to said mobile data processing device via a data channel of said wireless telephony link;

wherein said mobile data processing device registers with a base station of said wireless telephony network when said link is established such that said base station and said wireless telephony network are notified of a telephone number of said mobile data processing device for use in sending said malware definition updating data to said mobile data processing device;

wherein when received data is received at said mobile data processing device, a type of said received data is identified to determine if said received data is said malware definition updating data, such that if said received data is said malware definition updating data, a digital signature associated with said malware definition updating data is verified;

wherein if said digital signature is not verified, said malware definition updating data is ignored;

wherein if said digital signature is verified, said malware definition updating data is utilized to update malware definition data stored upon said mobile data processing device by appending said malware definition updating data to said malware definition data;

wherein said malware definition updating data is provided in a malware definition updating file, where said file is generated by one of automatically, semi-automatically, and manually upon an analysis of newly discovered malware and where said file includes a detection fingerprint, and at least one of a removal action and a disinfection action to be taken in response to a detection of said newly discovered malware;

wherein said mobile data processing device is identified by a database of subscribers to an update service associated with said malware scanner, where said database includes said telephone number of said mobile data processing device to which said malware definition updating data is to be sent and a type of said mobile data processing device such that only malware definition updating data that is appropriate to said type of said mobile data processing device is sent to said mobile data processing device.

26. A method as claimed in claim 25, wherein said mobile data processing device is a mobile telephone.

27. A method as claimed in claim 25, wherein said mobile data processing device is a personal digital assistant having a connection to said wireless public telephony network.

28. A method as claimed in claim 25, wherein said public wireless telephone network is one of a CDMA network and a GSM network.

29. A method as claimed in claim 25, wherein said data channel is also used for passing text messages.

30. A method as claimed in claim 29, wherein said text messages are SMS messages.

31. A method as claimed in claim 25, wherein transfer of said malware definition updating data is initiated from a source of said malware definition updating data.

32. A method as claimed in claim 25, wherein said data channel is open whenever said mobile data processing device is switched on and connected to said public wireless telephony network.

33. Apparatus for controlling a mobile data processing device to update malware definition data for a malware scanner of said mobile data processing device, said apparatus comprising:
(i) link establishing means for establishing a wireless telephony link between said mobile data processing device and a public wireless telephony network;
(ii) update receiving means for receiving malware definition updating data at said mobile data processing device via a data channel of said wireless telephony link; and
(iii) malware definition updating means for updating malware definition data stored upon said mobile data processing device using said malware definition updating data;

wherein said mobile data processing device registers with a base station of said wireless telephony network when said link is established such that said base station and said wireless telephony network are notified of a telephone number of said mobile data processing device for use in sending said malware definition updating data to said mobile data processing device;

wherein when received data is received at said mobile data processing device, a type of said received data is identified to determine if said received data is said malware definition updating data, such that if said received data is said malware definition. updating data, a digital signature associated with said malware definition updating data is verified;

wherein if said digital signature is not verified, said malware definition updating data is ignored;

wherein if said digital signature is verified, said malware definition updating data is utilized to update said malware definition data stored upon said mobile data processing device by appending said malware definition updating data to said malware definition data;

wherein said malware definition updating data is provided in a malware definition updating file, where said file is generated by one of automatically, semi-automatically, and manually upon an analysis of newly discovered malware and where said file includes a detection fingerprint, and at least one of a removal action and a disinfection action to be taken in response to a detection of said newly discovered malware;

wherein said mobile data processing device is identified by a database of subscribers to an update service associated with said malware scanner, where said database includes said telephone number of said mobile data processing device to which said malware definition updating data is to be sent and a type of said mobile data processing device such that only malware definition updating data that is appropriate to said type of said mobile data processing device is sent to said mobile data processing device.

34. Apparatus as claimed in claim 33, wherein said mobile data processing device is a mobile telephone.

35. Apparatus as claimed in claim 33, wherein said mobile data processing device is a personal digital assistant having a connection to said wireless public telephony network.

36. Apparatus as claimed in claim 33, wherein said public wireless telephone network is one of a CDMA network and a GSM network.

37. Apparatus as claimed in claim 33, wherein said data channel is also used for passing text messages.

38. Apparatus as claimed in claim 37, wherein said text messages are SMS messages.

39. Apparatus as claimed in claim 33, wherein said step of transferring is initiated from a source of said malware definition updating data.

40. Apparatus as claimed in claim 33, wherein said data channel is open whenever said mobile data processing device is switched on and connected to said public wireless telephony network.

41. Apparatus for controlling a computer to initiate updating of malware definition data for a malware scanner of a mobile data processing device, said apparatus comprising:

(i) link establishing means for establishing a wireless telephony link to said mobile data processing device via a public wireless telephony network; and (ii) update sending means for sending malware definition updating data to said mobile data processing device via a data channel of said wireless telephony link;

wherein said mobile data processing device registers with a base station of said wireless telephony network when said link is established such tat said base station and said wireless telephony network are notified of a telephone number of said mobile data processing device for use in sending said malware definition updating data to said mobile data processing device;

wherein when received data is received at said mobile data processing device, a type of said received data is identified to determine if said received data is said malware definition updating data, such that if said received data is said malware definition updating data, a digital signature associated with said malware definition updating data is verified;

wherein if said digital signature is not verified, said malware definition updating data is ignored;

wherein if said digital signature is verified, said malware definition updating data is utilized to update malware definition data stored upon said mobile data processing device by appending said malware definition updating data to said malware definition data;

wherein said malware definition updating data is provided in a malware definition updating file, where said file is generated by one of automatically, semi-automatically, and manually upon an analysis of newly discovered malware and where said file includes a detection fingerprint, and at least one of a removal action and a disinfection action to be taken in response to a detection of said newly discovered malware;

wherein said mobile data processing device is identified by a database of subscribers to an update service associated with said malware scanner, where said database includes said telephone number of said mobile data processing device to which said malware definition undating data is to be sent and a type of said mobile data processing device such that only malware definition updating data that is appropriate to said type of said mobile data processing device is sent to said mobile data processing device.

42. Apparatus as claimed in claim 41, wherein said mobile data processing device is a mobile telephone.

43. Apparatus as claimed in claim 41, wherein said mobile data processing device is a personal digital assistant having a connection to said wireless public telephony network.

44. Apparatus as claimed in claim 41, wherein said public wireless telephone network is one of a CDMA network and a GSM network.

45. Apparatus as claimed in claim 41, wherein said data channel is also used for passing text messages.

46. Apparatus as claimed in claim 45, wherein said text messages are SMS messages.

47. Apparatus as claimed in claim 41, wherein transfer of malware definition updating data is initiated from a source of said malware definition updating data.

48. Apparatus as claimed in claim 41, wherein said data channel is open whenever said mobile data processing device is switched on and connected to said public wireless telephony network.

* * * * *

UNITED STATES PATENT AND TRADEMARK OFFICE
CERTIFICATE OF CORRECTION

PATENT NO. : 7,210,168 B2
APPLICATION NO. : 09/976009
DATED : April 24, 2007
INVENTOR(S) : Hursey et al.

It is certified that error appears in the above-identified patent and that said Letters Patent is hereby corrected as shown below:

In the claims:
col. 6, line 26 replace "decide" with --device--;
col. 6, line 28 replace "establish" with --establishing--;
col. 7, line 45 replace "link." with --link;--;
col. 7, line 57 replace "undating" with --updating--;
col. 7, line 59 replace "undating" with --updating--;
col. 7, line 61 replace "ignored," with --ignored;--;
col. 8, line 14 replace "undating" with --updating--;
col. 9, line 4 replace "undating" with --updating--;
col. 9, line 23 replace "undating" with --updating--;
col. 9, line 47 replace "of;" with --of:--;
col. 12, line 3 replace "tat" with --that--;
col. 12, line 35 replace "undating" with --updating--.

Signed and Sealed this

Ninth Day of February, 2010

David J. Kappos
*Director of the United States Patent and Trademark Office*